(12) United States Patent
Hanaya et al.

(10) Patent No.: US 6,962,230 B2
(45) Date of Patent: Nov. 8, 2005

(54) GAS EXHAUST STRUCTURE OF FUEL-CELL-POWERED VEHICLE

(75) Inventors: Ryukou Hanaya, Wako (JP); Tohru Ono, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 0 days.

(21) Appl. No.: 10/177,810

(22) Filed: Jun. 20, 2002

(65) Prior Publication Data

US 2003/0037983 A1    Feb. 27, 2003

(30) Foreign Application Priority Data

Aug. 22, 2001    (JP)    ............................. 2001-252097

(51) Int. Cl.⁷ .............................................. B60K 13/06
(52) U.S. Cl. ....................... 180/309; 180/89.2; 293/113
(58) Field of Search ......................... 180/309, 69.25, 180/89.2; 296/97.22; 280/781, 782; 293/113, 293/115

(56) References Cited

U.S. PATENT DOCUMENTS

| | | | | |
|---|---|---|---|---|
| 2,104,182 A | * | 1/1938 | Best .......................... | 362/505 |
| 2,290,621 A | * | 7/1942 | Riesing ...................... | 248/613 |
| 2,841,232 A | * | 7/1958 | Loeffler ..................... | 180/89.2 |
| 2,856,020 A | * | 10/1958 | Hoagg et al. .............. | 180/309 |
| 2,979,357 A | * | 4/1961 | Leach et al. ............... | 293/113 |
| 2,992,035 A | * | 7/1961 | Tell et al. .................. | 293/113 |
| 5,022,479 A | * | 6/1991 | Kiser et al. ................ | 180/68.3 |
| 5,090,760 A | * | 2/1992 | Wheeler .................... | 296/1.06 |
| 5,780,125 A | * | 7/1998 | Takeuchi et al. ........... | 428/31 |
| 6,405,819 B1 | * | 6/2002 | Ohkura et al. ............. | 180/68.1 |

FOREIGN PATENT DOCUMENTS

| | | | | | |
|---|---|---|---|---|---|
| JP | 57-172848 | * | 10/1982 | ........... | B60R 19/02 |
| JP | 6-219224 | * | 8/1994 | ........... | B60R 19/52 |

* cited by examiner

*Primary Examiner*—Frank Vanaman
(74) *Attorney, Agent, or Firm*—Hamre, Schumann, Mueller & Larson, P.C.

(57) ABSTRACT

A gas exhaust structure of a fuel-cell-powered vehicle includes a recess formed in a rear bumper with a surrounding wall. An opening of the recess is covered with louvers to allow ventilation, thereby to form a chamber. A discharge end of the discharge pipe is mounted to the chamber. An exhaust gas including hydrogen is guided through the discharge pipe into the chamber and is emitted from the opening to the outside of the vehicle.

6 Claims, 5 Drawing Sheets

GAS EXHAUST STRUCTURE OF FUEL-CELL-POWERED VEHICLE

FIELD OF THE INVENTION

This invention relates to a fuel-cell-powered vehicle and, more particularly, to a gas exhaust structure for emitting hydrogen leaked from fuel cells to the outside of the vehicle through a discharge pipe.

BACKGROUND OF THE INVENTION

A fuel-cell-powered vehicle is propelled with a motor driven by electricity generated in fuel cells supplied with hydrogen and oxygen (air). Some fuel-cell-powered vehicles have housing boxes holding fuel cells and discharge pipes connected to the housing boxes and extended to a position below rear bumpers.

In this kind of fuel-cell-powered vehicle, hydrogen leaked for some reason can stay in the housing box. The hydrogen staying in the housing box is emitted together with air having used for ventilation from a discharge opening of the discharge pipe at a position below the rear bumper. Thus an exhaust gas including hydrogen is caused to flow rearward of the vehicle.

The vehicle has an air vent provided in a rear wall (rear panel) serving as a partition between the passenger compartment and the outside of the compartment and emits air in the compartment to the outside through the air vent. The air vent is positioned above the discharge opening of the discharge pipe. The exhaust gas including hydrogen emitted from the discharge opening is emitted from a position below the rear bumper to the rear of the vehicle.

The exhaust gas including hydrogen emitted rearward from the discharge opening can be caused to flow toward the vehicle body for some reason. In this case, the exhaust gas including hydrogen flowing toward the vehicle body can flow upward toward the air vent and enter the passenger compartment through the air vent. It is thus desired to implement an exhaust structure which securely prevents an exhaust gas including hydrogen from entering the passenger compartment.

SUMMARY OF THE INVENTION

According to the present invention, there is provided a gas exhaust structure of a fuel-cell-powered vehicle in which an exhaust gas including hydrogen emitted from the fuel-cell-powered vehicle is emitted through a discharge pipe to the atmosphere, the structure comprises: a surrounding wall provided in either of a front bumper and a rear bumper of the fuel-cell-powered vehicle, for forming a recess set back toward the vehicle body; and a chamber formed with an opening of the recess formed by the surrounding wall covered with a guard member to allow ventilation; wherein a discharge end of the discharge pipe is mounted to the chamber.

The recess is formed with the surrounding wall in the bumper. The opening of the recess is covered by the guard member to allow ventilation to form the chamber. The discharge end of the discharge pipe is mounted to the chamber. This allows the exhaust gas including hydrogen emitted from the discharge opening of the discharge pipe to flow out through the opening to outside the vehicle. Further, the covering of the opening of the recess using the guard member hides the discharge opening of the discharge pipe, so that the discharge opening of the discharge pipe is invisible from the outside.

The discharge end of the discharge pipe is mounted to the surrounding wall using a grommet. This facilitates sealing the gap between the discharge pipe and the surrounding wall, leading to the facilitated mounting of the discharge pipe. In addition, the mounting of the discharge pipe using the grommet absorbs assembly tolerance (error) using the elastic deformation of the grommet. This provides secured sealing of the gap between the surrounding wall and the discharge pipe.

A drain hole is formed in the surrounding wall. This facilitates the drain of rainwater or wash water entering from the opening of the chamber, through the drain hole.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
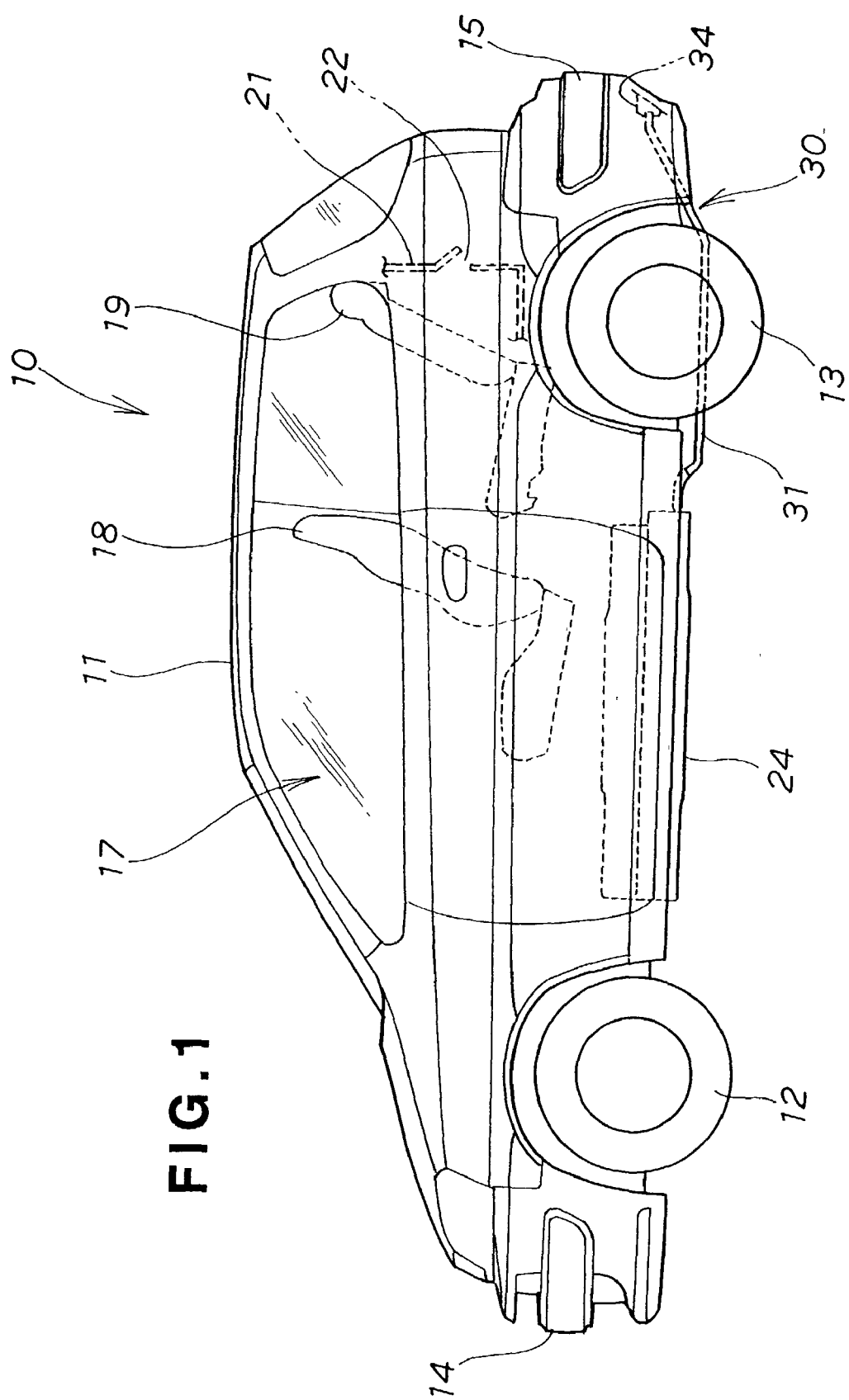
FIG. 1 is a side view of a fuel-cell-powered vehicle with an exhaust structure according to the present invention.

Referring to FIG. 1, a fuel-cell-powered vehicle 10 has front wheels 12 in the front of a vehicle body 11 and rear wheels 13 in the rear of the vehicle body 11. A front bumper 14 is mounted to the front of the body forward of the front wheels 12. A rear bumper 15 is mounted to the rear of the body rearward of the rear wheels 13. A front seat 18 and a rear seat 19 are disposed in a passenger compartment 17. A rear panel 21 serving as a partition between the passenger compartment 17 and the outside is provided rearward of the rear seat 19. The rear panel 21 has an air vent 22 for emitting air inside the passenger compartment 17 to the outside of the compartment. A housing box 24 holding fuel cells (not shown) is disposed beneath a floor plate constituting the floor of the compartment. The housing box 24 is provided with a gas exhaust structure 30 of the fuel-cell vehicle.

The gas exhaust structure 30 includes a discharge pipe 31 extending from the housing box 24 to the rear bumper 15, and emits an exhaust gas including hydrogen staying inside the housing box 24 to the outside of the vehicle through the discharge pipe 31.

Figure 2:
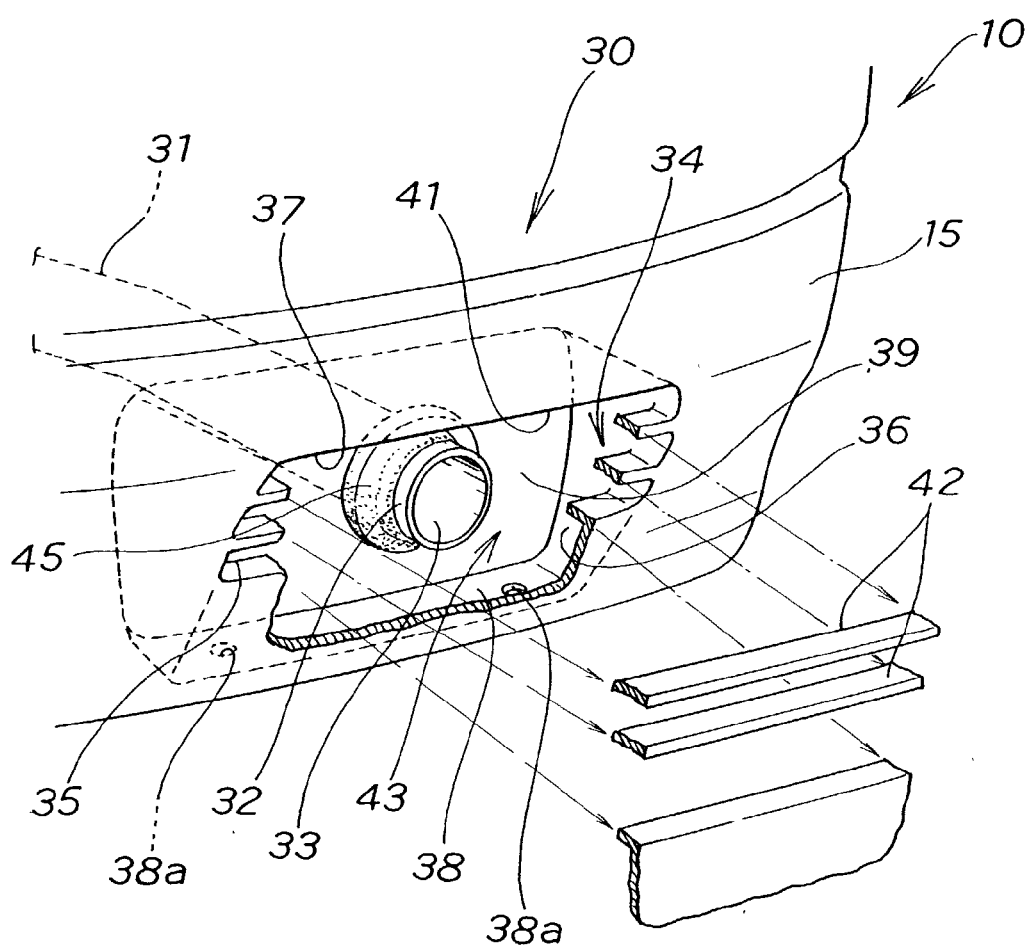
FIG. 2 is a perspective view illustrating the relationship between a chamber formed in a rear bumper and a discharge pipe.

In FIG. 2, the rear bumper 15 has a recess set back toward the vehicle body. The recess is formed with a surrounding wall 34. A chamber 43 is formed in the rear bumper 15 with an opening 41 of the recess covered by louvers (guard member) 42 to allow ventilation. A discharge end 32 of the discharge pipe 31 is inserted into the chamber 43.

The surrounding wall 34 consists of left and right side walls 35, 36, a ceiling wall 37, a bottom wall 38 and a front wall 39, forming the recess. The front wall 39 is formed with a mounting hole 39a (See FIG. 4) for mounting a grommet 45. The bottom wall 38 is formed with drain holes 38a on the left and right ends.

Figure 3:
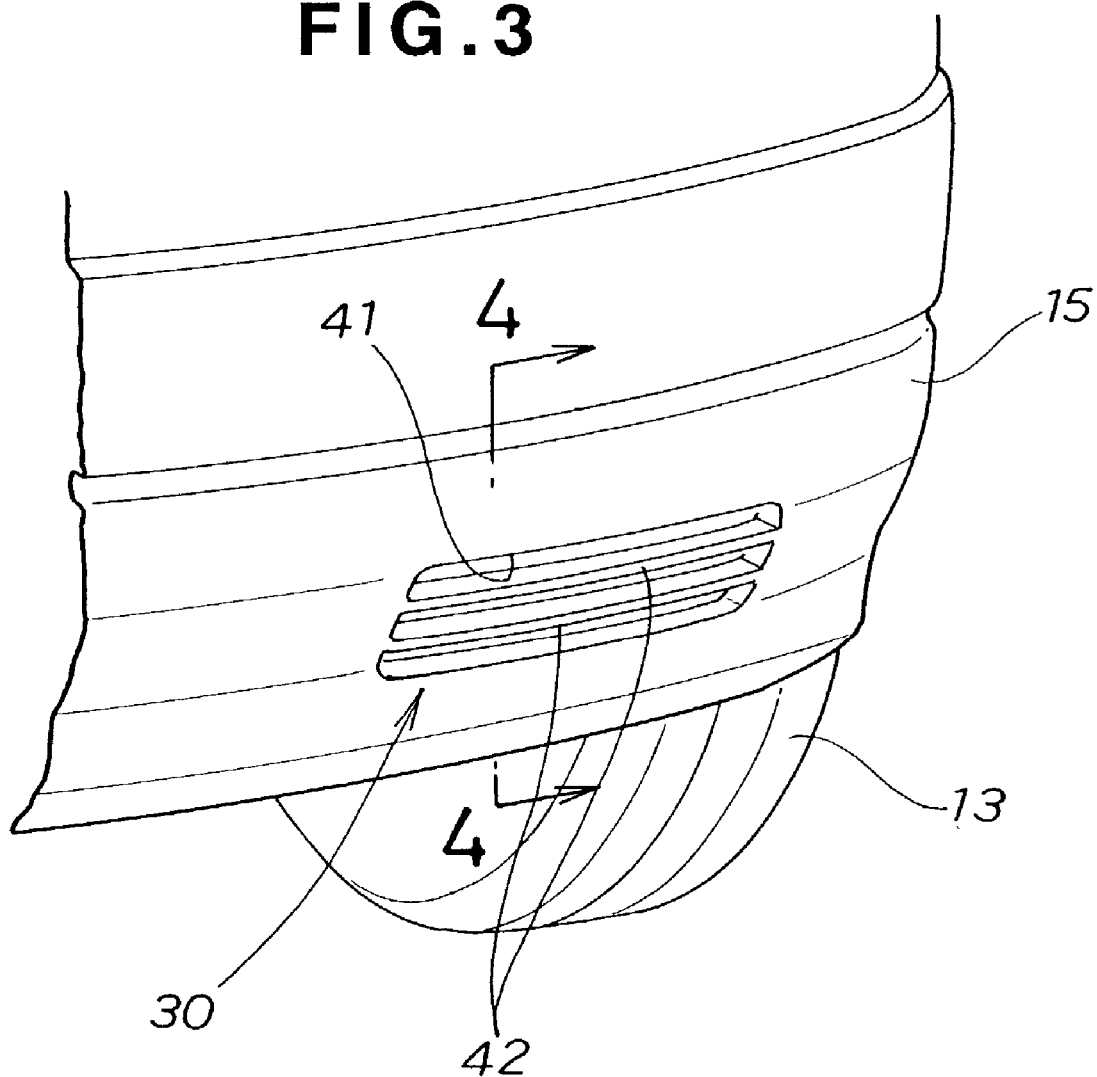
FIG. 3 is a diagram illustrating an opening of a recess formed in the rear bumper, covered with louvers to allow ventilation.

FIG. 3 illustrates the gas exhaust structure 30 formed in the rear bumper 15 with the opening 41 of the recess covered by the louvers 42 to allow ventilation.

Covering the opening 41 of the recess with the louvers 42 to allow ventilation makes a discharge opening 33 of the discharge pipe 31 shown in FIG. 2 invisible from the outside, improving the appearance of the fuel-cell-powered vehicle 10.

The guard member covering the opening 41 of the recess, allowing ventilation is not limited to the louvers 42. Another member such as bars, a lattice, a net or punching metal may be used instead.

Figure 4:
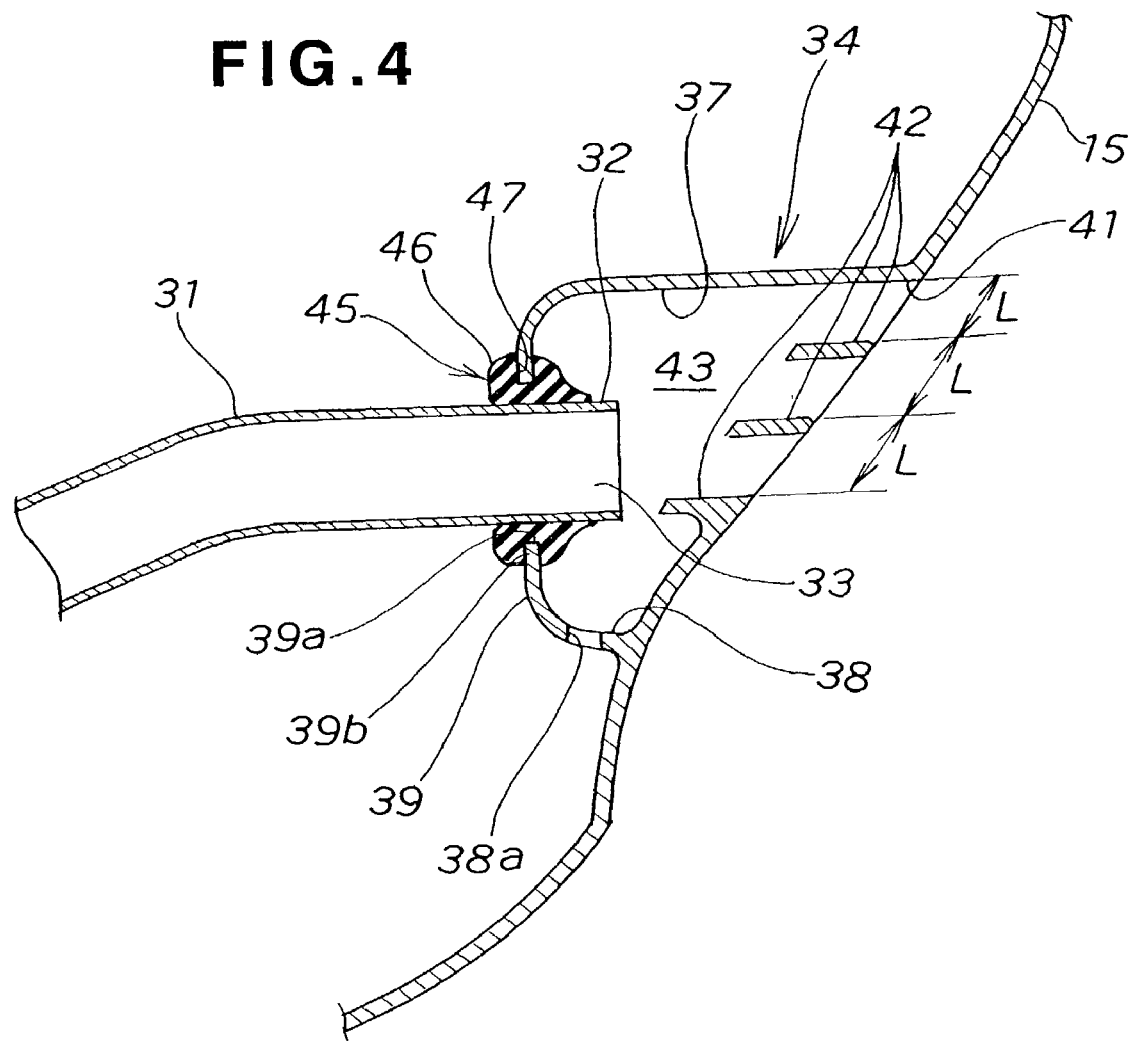
FIG. 4 is an enlarged cross-sectional view taken along line 4—4 in FIG. 3.

FIG. 4 illustrates the discharge opening 33 opposed to the chamber 43 in a manner that the recess is formed with the surrounding wall 34 in the rear bumper 15 and the discharge end 32 of the discharge pipe 31 is mounted to the front wall 39 of the surrounding wall 34 via the grommet 45.

The grommet 45 is a rubber member formed in a cylindrical shape, the inside diameter of which is set smaller than the outside diameter of the discharge pipe 31. The grommet 45 has a circular groove 47 in an outer periphery 46 thereof.

The grommet 45 is inserted into the mounting hole 39a of the front wall 39 and the circular groove 47 of the grommet 45 is fitted onto an edge 39b of the mounting hole 39a so as to mount the grommet 45 to the front wall 39. The discharge end 32 of the discharge pipe 31 is inserted into the grommet 45 mounted to the front wall 39 so that the discharge pipe 31 is mounted to the front wall 39 of the surrounding wall 34.

Thus mounting the discharge end 32 of the discharge pipe 31 to the recess using the grommet 45 facilitates sealing the gap between the discharge pipe 31 and the mounting hole 39a. The facilitated mounting of the discharge pipe 31 results in increase in productivity.

In addition, mounting the discharge pipe 31 using the grommet 45 absorbs assembly tolerance (error) with the elastic deformation of the grommet 45. This results in secure sealing of the gap between the discharge pipe 31 and the mounting hole 39a, securely preventing an exhaust gas including hydrogen emitted inside the chamber 43 from flowing back toward the inside of the vehicle body.

This figure further illustrates the louvers 42 provided at predetermined intervals L at the opening 41 of the recess formed in the rear bumper 15.

The provision of the louvers 42 at the predetermined intervals L at the opening 41 of the recess allows an exhaust gas including hydrogen staying in the chamber 43 to be emitted through the gaps between the louvers 42 to the outside. This prevents reverse flow of the exhaust gas including hydrogen toward the vehicle body.

In particular, hydrogen lighter in weight than air is prevented from flowing into the vehicle body through the drain holes 38a.

This figure also illustrates the drain hole 38a provided in the bottom wall 38 of the surrounding wall 34. The provision of the drain holes 38a in the bottom wall 38 of the surrounding wall 34 facilitates the drain of rainwater or wash water entering from the opening 41 (gaps between the louvers 42) of the recess, through the drain holes 38a.

Figure 5:
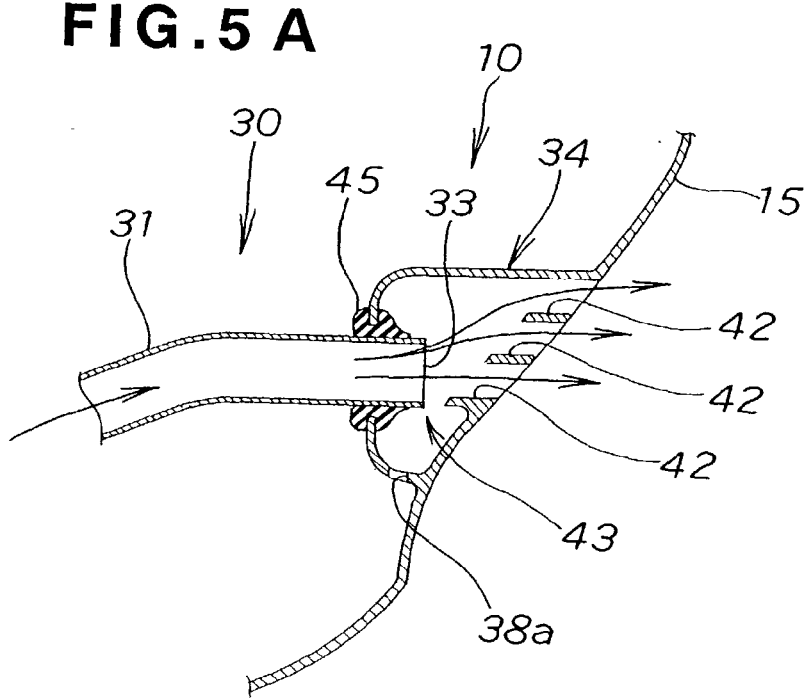
FIG. 5A is a cross-sectional view illustrating the emission of gas.
FIG. 5B is a cross-sectional view illustrating the drain of water.
Figure 5:
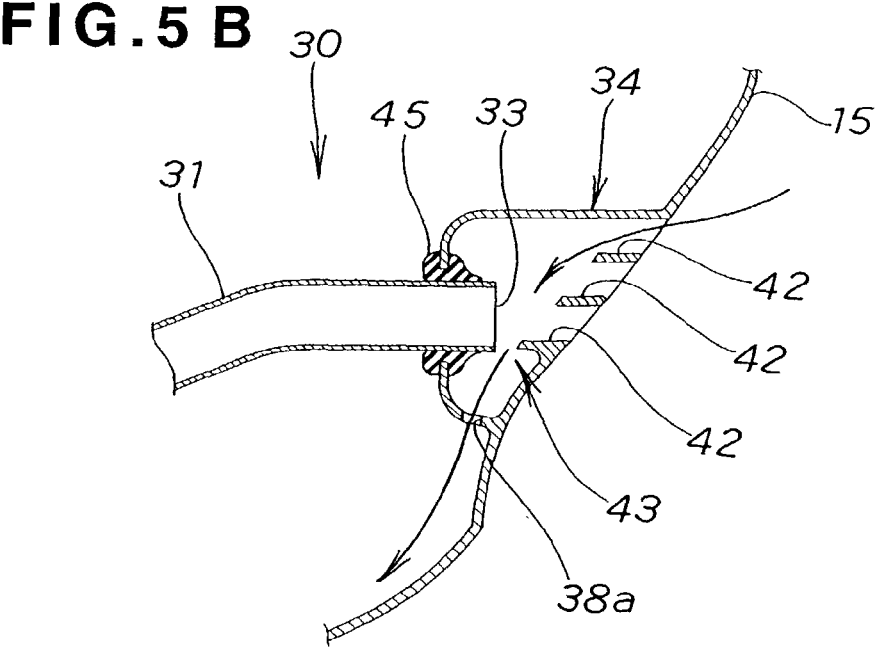

FIGS. 5A and 5B explanatory show the function of the exhaust structure of the fuel-cell-powered vehicle according to the present invention, in which FIG. 5A illustrates gas emission and FIG. 5B illustrates water drain.

In FIG. 5A, the fuel-cell-powered vehicle 10 (See FIG. 1), during running, introduces air into the housing box 24 to ventilate the housing box 24, guides air having used for ventilation along the discharge pipe 31 together with hydrogen as shown by an arrow, and emits the guided exhaust gas including hydrogen from the discharge opening 33 of the discharge pipe 31 into the chamber 43 as shown by arrows.

The exhaust gas including hydrogen flowing into the chamber 43 flows through the gaps between the louvers 42 to the rear of the vehicle. The flowing out of the exhaust gas including hydrogen emitted from the discharge opening 33 of the discharge pipe 31, from the chamber 43 to the rear of the vehicle results in secure prevention of the exhaust gas including hydrogen entering the passenger compartment 17.

In FIG. 5B, although rainwater or wash water can enter the chamber 43 through the gaps between the louvers 42, the rainwater or wash water entering the chamber 43 is easily drained downward of the rear bumper 15 through the drain holes 38a.

Although the above embodiment has been described in relation to the discharge pipe 31 extended to the rear bumper 15 in opposed relation to the discharge opening 33 to the chamber 43 of the rear bumper 15, the present invention is not limited thereto. A discharge pipe may be extended to a front bumper to oppose a discharge opening of the discharge pipe to a chamber of the front bumper.

The above embodiment has been described in the case of emitting hydrogen staying in the fuel cell housing box 24 using the gas exhaust structure 30 of the present invention. The exhaust structure 30 is not limited in its use to the emission of hydrogen staying in the housing box 24, and may be used as means for emitting hydrogen emitted from other various kinds of equipment to the atmosphere.

That is, the use of the exhaust structure 30 of the present invention allows secure emission of an exhaust gas including hydrogen emitted from various kinds of equipments of the fuel-cell-powered vehicle 10 to the atmosphere.

Although the above embodiment has been described with the discharge end 32 of the discharge pipe 31 inserted into the chamber 43 so as to dispose the discharge end 32 in the chamber 43, another means may be used to mount the discharge end 32 of the discharge pipe 31 to the chamber 43 and dispose the discharge end 32 in the chamber 43.

The present disclosure relates to the subject matter of Japanese Patent Application No. 2001-252097, filed Aug. 22, 2001, the disclosure of which is expressly incorporated herein by reference in its entirety.

What is claimed is:

1. A gas exhaust structure, comprising:
   a bumper of a fuel-cell-powered vehicle;
   a discharge pipe configured to discharge a hydrogen exhaust gas that is emitted from the fuel-cell-powered vehicle;
   a surrounding wall formed by a pan of said bumper of said fuel-cell-powered vehicle, and forming a recess set back toward the vehicle body, said surrounding wall consisting of a front wall, left and right side walls, a ceiling wall, and a bottom wall joined together to form said recess, said front, side, ceiling and bottom walls of the surrounding wall being formed by said part of the bumper, said recess having an opening formed in said bumper and located opposite the front wall of the surrounding wall; and
   a chamber formed in said recess by said surrounding wall and a guard member covering said opening of said recess to allow ventilation of said chamber, said chamber having a resulting profile associated with the viewing of a section taken parallel to a length of the fuel-cell-powered vehicle such that said chamber has a width increasing gradually in a direction from a lower area of said chamber in the vicinity of said bottom wall toward an upper area of said chamber in the vicinity of said ceiling wall;

wherein said discharge pipe has a discharge end inserted through said front wall of the surrounding wall into said chamber and mounted to said front wall of said surrounding wall, so that the hydrogen exhaust gas discharged from the discharge pipe into the chamber is allowed to flow out through the opening in the bumper to the outside of the fuel-cell-powered vehicle.

2. A gas exhaust structure as set forth in claim 1, wherein said surrounding wall has a drain hole formed in said bottom wall.

3. A gas exhaust structure as set forth in claim 1, wherein said discharge end of said discharge pipe is mounted via a grommet to said front wall of said surrounding wall.

4. A gas exhaust structure as set forth in claim 3, wherein said surrounding wall has a drain hole formed in said bottom wall.

5. A gas exhaust structure as set forth in claim 1, wherein said guard member comprises a plurality of horizontal louvers.

6. A gas exhaust structure as set forth in claim 1, wherein said chamber is formed in a lower part of said bumper.

* * * * *